(12) United States Patent
Johnston et al.

(10) Patent No.: US 7,058,663 B2
(45) Date of Patent: Jun. 6, 2006

(54) AUTOMATIC DATA UPDATE

(75) Inventors: James A. Johnston, Bellevue, PA (US); Robert P. Smith, Pittsburgh, PA (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 706 days.

(21) Appl. No.: 09/804,034

(22) Filed: Mar. 13, 2001

(65) Prior Publication Data

US 2002/0133509 A1    Sep. 19, 2002

(51) Int. Cl.
*G06F 17/30* (2006.01)
*G06F 7/00* (2006.01)
*G06F 12/00* (2006.01)

(52) U.S. Cl. .................. 707/200; 707/10; 707/201; 707/204

(58) Field of Classification Search ................ 707/200, 707/204, 10, 201
See application file for complete search history.

(56) References Cited

U.S. PATENT DOCUMENTS

| | | | | |
|---|---|---|---|---|
| 5,471,629 A | | 11/1995 | Risch | ......................... 395/800 |
| 5,581,750 A | | 12/1996 | Haderle et al. | ............. 395/618 |
| 5,706,510 A | * | 1/1998 | Burgoon | ...................... 707/203 |
| 6,006,239 A | * | 12/1999 | Bhansali et al. | ............ 707/201 |
| 6,078,924 A | * | 6/2000 | Ainsbury et al. | ........... 707/101 |
| 6,205,478 B1 | * | 3/2001 | Sugano et al. | .............. 709/223 |
| 6,240,414 B1 | * | 5/2001 | Beizer et al. | ................... 707/8 |
| 6,341,291 B1 | * | 1/2002 | Bentley et al. | ............. 707/203 |
| 6,345,288 B1 | * | 2/2002 | Reed et al. | .................. 709/201 |
| 6,393,419 B1 | * | 5/2002 | Novak et al. | ................... 707/8 |
| 2002/0123813 A1 | * | 9/2002 | Bickley et al. | ............... 700/99 |

* cited by examiner

*Primary Examiner*—Frantz Coby
*Assistant Examiner*—Cindy Nguyen (57) ABSTRACT

A process of accessing data in a database, inputting the accessed data to a form, using the form with the accessed data by a first user, monitoring the database to detect changes to the accessed data by a second user while the form is being used by the first user, updating the accessed data in the form while being used by the first user in accordance with rules corresponding to the detected changes, and displaying update status of the accessed data in accordance with the updating. The update status can indicate if the accessed data has not been changed since the first user began using the accessed data; if the first user has changed the accessed data; and if the second user has changed the accessed data while the first user is using the accessed data. The process can be implemented in a standalone processing device or in a network.

8 Claims, 6 Drawing Sheets

AUTOMATIC DATA UPDATE

BACKGROUND OF THE INVENTION

1. Field of the Invention

The present invention relates to automatically updating data elements used by software applications. In particular, the present invention relates to automatically updating data elements in form documents used by software applications.

2. Description of the Related Art

Existing systems can allow different or same applications accessing a common database to simultaneously use/access the database. In particular, applications using form documents that contain data elements allow users using the applications to simultaneously edit (update) the data elements in the forms. A data element may be, for example, a field, including entries (data) in the field. Typically, to achieve such simultaneous use the system locks the common database or the applicable data elements when a first user begins working on a form, for example, to input or edit data elements, thereby precluding other users from accessing the common database, or working on the form or certain data elements of the form while the form is being accessed by the first user. Therefore, typical systems implement "a last in, last win" update procedure. In particular, in a typical system data entered by a first user in a form can be overwritten by another user before the first user finalizes the form, such as by signing the form electronically, saving, printing or forwarding.

Further, in existing systems maintaining a common (main/primary/central) database and a local (application-based) database, the common database and the application-based database should be synchronized. For example, in a network environment, such as a client-server network, where the common database is a network (server) database, local application-based databases on client terminals advantageously allows users to perform application tasks without a network connection. When maintaining two separate databases, either in a network environment or in a standalone environment where multiple applications execute, each with an application-based database and a local common database, a transaction log, which is a database, can maintain a log of changes made to the application-based databases. The application-based databases can be synchronized with the common database at a later time, for example, when the user again connects to the network. Such synchronization, however, gives rise to the problem of last in, last win when changes by users, respectively, are applied to the common database. For example, in the network environment, upon synchronization, changes made offline could become the latest changes in the main database irrespective of what other users had performed.

More particularly, in the system maintaining two databases and using forms that share or use common data elements, when users simultaneously edit the common data elements in different forms, a user cannot be aware of changes made by other users, potentially overwriting (deleting) the other users' data. Further, in such a system the user can approve a form without knowledge of changes made by the other users. In addition, such a system provides inefficient data input by the users. For example, two users open the same empty form or different empty forms that share common data elements, when a first user completes the form and saves the form (storing data in the main database), the second user would not know that some of the fields in the form opened by the second user have already been completed by the first user. Therefore, when the second user also completes the fields and saves the form, the first user's data are overwritten or deleted. Further, the second user cannot take advantage of using fields already completed by the first user, requiring repetitious data entry.

SUMMARY OF THE INVENTION

According to the embodiments of the present invention, the present invention can be attained by monitoring a database to detect changes to accessed data in the database, and updating the accessed data during use of the data in accordance with synchronization rules in response to the detected changes.

Further, the present invention can be attained by a device comprising a processor monitoring a database to detect changes to accessed data in the database, and updating the accessed data during use of the data in accordance with synchronization rules in response to the detected changes.

Further, the present invention can be attained by a process of accessing data stored in a database, inputting the accessed data to a form, using the form with the inputted accessed data by a first user, monitoring the database to detect changes to the accessed data by a second user while the form is being used by the first user, updating the accessed data in the form while being used by the first user in accordance with rules corresponding to the detected changes, displaying update status of the accessed data in accordance with the updating, and storing the accessed data in the database by the first user. The rules are applied to synchronize simultaneous changes being made to data in a database. The update status of the accessed data can be a displayed message indicating if the accessed data has not been changed since the first user began using the accessed data; if the first user has changed the accessed data; and if the second user has changed the accessed data while the first user is using the accessed data. Further, the present invention can be attained by implementing the process of the present invention in a standalone computer or a standalone processing device, in a network environment, such as a client-server system or the Internet.

Further, the present invention can be attained by a device comprising means for accessing data stored in a database; means for inputting the accessed data to a form; means for using the form with the inputted accessed data by a first user; means for monitoring the database to detect changes to the accessed data by a second user while the form is being used by the first user; and means for updating the accessed data in the form while being used by the first user in accordance with rules corresponding to the detected changes.

Further, the present invention can be attained by a system to automatically update forms, the system comprising a server storing data in a database; and clients connected to the server via a network and accessing the data stored in the database, wherein the accessed data is input to a form used by a first user, the database being monitored to detect changes to the accessed data by a second user while the form is being used by the first user, and the accessed data in the form being updated while being used by the first user in accordance with rules corresponding to the detected changes.

Further the present invention can be attained by a computer readable media encoded with processing instructions for implementing a method of automatically updating forms to be performed by a computer, the method comprising accessing data stored in a database; inputting the accessed data to a form; using the form with the inputted accessed data by a first user; monitoring the database to detect changes to the accessed data by a second user while the form is being used by the first user; and updating the accessed data in the form while being used by the first user in accordance with rules corresponding to the detected changes.

BRIEF DESCRIPTION OF THE DRAWINGS

The advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
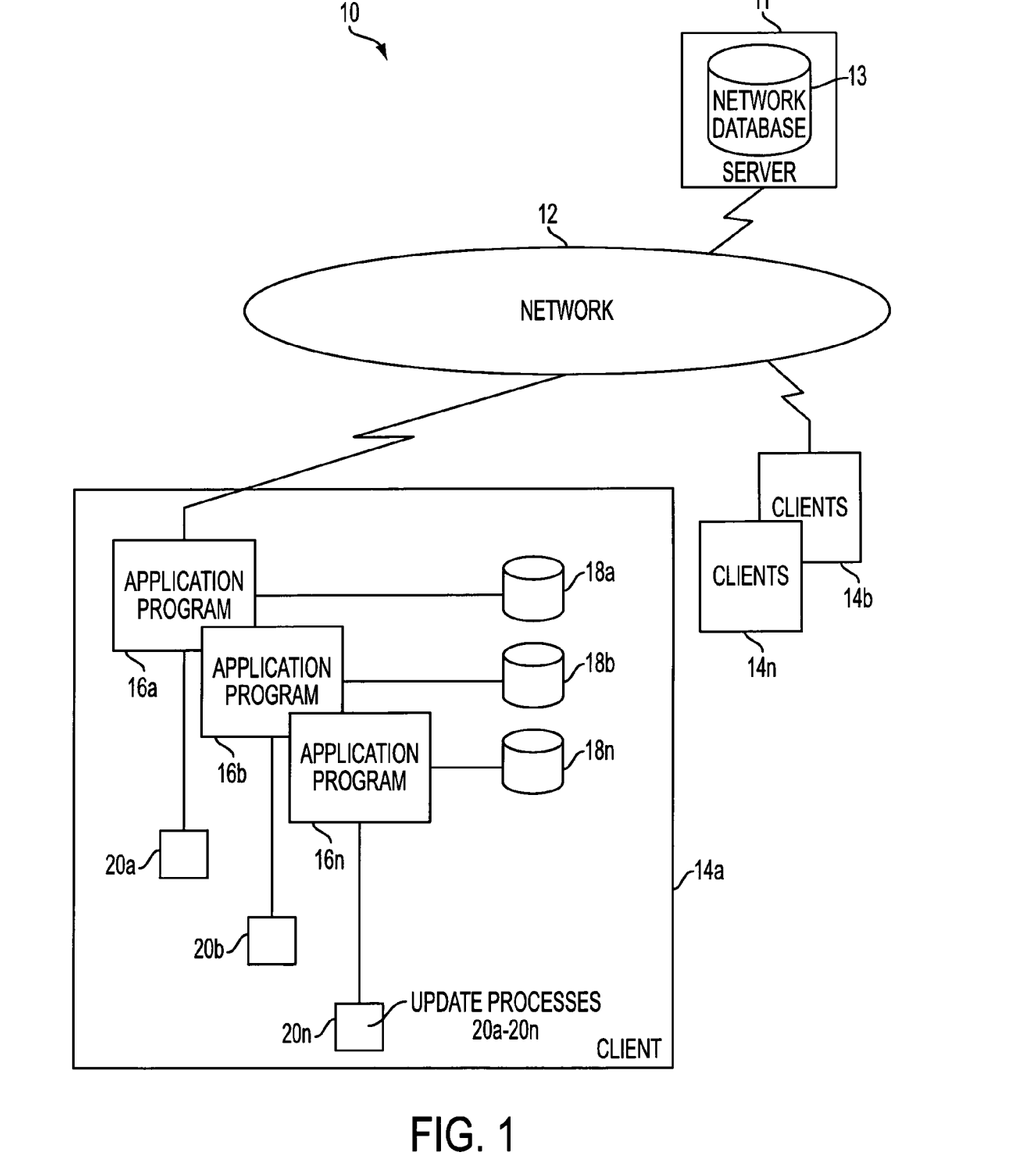
FIG. 1 is a functional block diagram of software according to the present invention in an embodiment of a computer system in which the present invention can be implemented.

FIG. 1 is a functional block diagram of software according to the present invention as implemented in a network 10. The network 10 may, for example, have a conventional topology and a conventional architecture, such as a client-server architecture, using conventional communication protocols. The network 10 can, for example, be a local area network or a wide area network, such as the Internet. Referring to FIG. 1, at least one server 11 is in communication with network 12 and the server 11 stores data in a database 13. The database 13 (also referred to as the common/network/central/main/primary database) can, for example, be a conventional (commercial) database management system (DBMS) supporting conventional or standard query languages, such as structured query language (SQL). Client terminals 14a–14n are in communication with the network 12 and execute software that use/access the data in database 13 via the network 12 using the DBMS functions. The at least one server 11 and the client terminals 14a–14n may, for example, be conventional computers, such as personal, portable and hand-held computers, or other computing devices, capable of storing, displaying and processing information, and communicating with remote computers and computing devices by receiving and transmitting information via a network using conventional techniques.

Each client terminal 14a can execute applications (software) 16a–16n, which access the network database 13 to retrieve and store data in the database 13 for use, for example, by users. Use of the data may involve viewing, editing, input of new data (creation) in the database 13 or processing of the data. Further, application programs 16a–16n may maintain local databases 18a–n, respectively. Although, in one embodiment, an application program does not maintain a separate local database. The present invention can take the form of a program segment included in each application program 16. In a preferred embodiment, the present invention takes the form of software processes (update process) 20a–20n executing in a multi-tasking operating system environment in a computer and communicating using conventional programming techniques with the respective application programs 16. In particular, each software process 20 may be implemented as a thread executing in the client terminals 14. Operation of software processes 20a–20n corresponding respectively to application programs 16a–16n will be described in more detail below.

Figure 2:
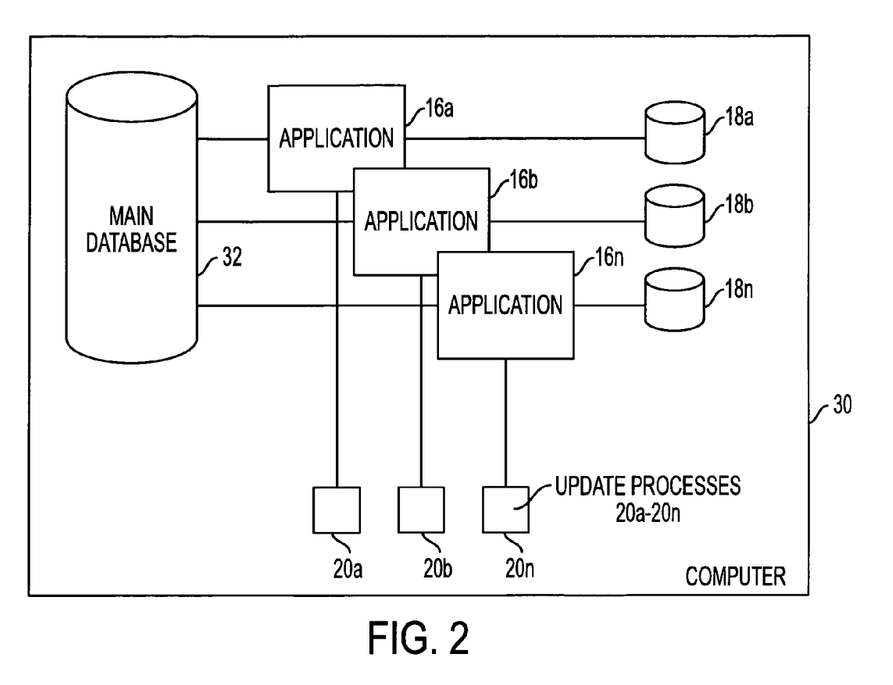
FIG. 2 is a functional block diagram of software according to the present invention in another embodiment of a computer system in which the present invention can be implemented.

FIG. 2 is a functional block diagram of software according to the present invention as implemented in a standalone computing device 30. The computing device 30 may, for example, be a conventional computer, such as a personal, portable and hand-held computer, or other computing device, capable of storing, displaying and processing information. Storage devices to store information, such as memory, hard drives, or drives for removable media (e.g., CD-R, CD-ROM, CD-RW, DVD-ROM, DVD-R and DVD-RAM) may be connected to the device 30 by conventional techniques to provide local storage for the device 30. Although not required for the present invention when implemented in a standalone system, the computing device 30 may have the capability to communicate with other computers and computing devices by receiving and transmitting information via a network using conventional techniques. Device 30 also executes applications (software) 16a–16n. The application programs 16a–16n access the common database 32 stored locally in the device 30, to retrieve and store data in the database 32 for use, for example, by users. Similar to the embodiment shown in FIG. 1, the database 32 can be a conventional DBMS supporting conventional or standard query languages, such as SQL. Use of the data may involve viewing, editing, input of new data (creation) in the database 32 or processing of the data. Further, although not required, the application programs 16a–16n may maintain corresponding application databases 18a–18n, respectively. The present invention can take the form of a program segment included in each application program 16, respectively. In a preferred embodiment, the present invention takes the form of software processes 20a–20n executing in a multi-tasking operating system environment on the device 30 and communicating using conventional programming techniques with the respective application programs 16. In particular, each software process 20 may be implemented as a thread executing in the device 30. Operation of software processes 20a–20n corresponding respectively to application programs 16a–16n will be described in more detail below. Of course, the present invention is not limited or tied to any particular hardware architecture and FIGS. 1 and 2 as described above provide only examples.

Figure 3:
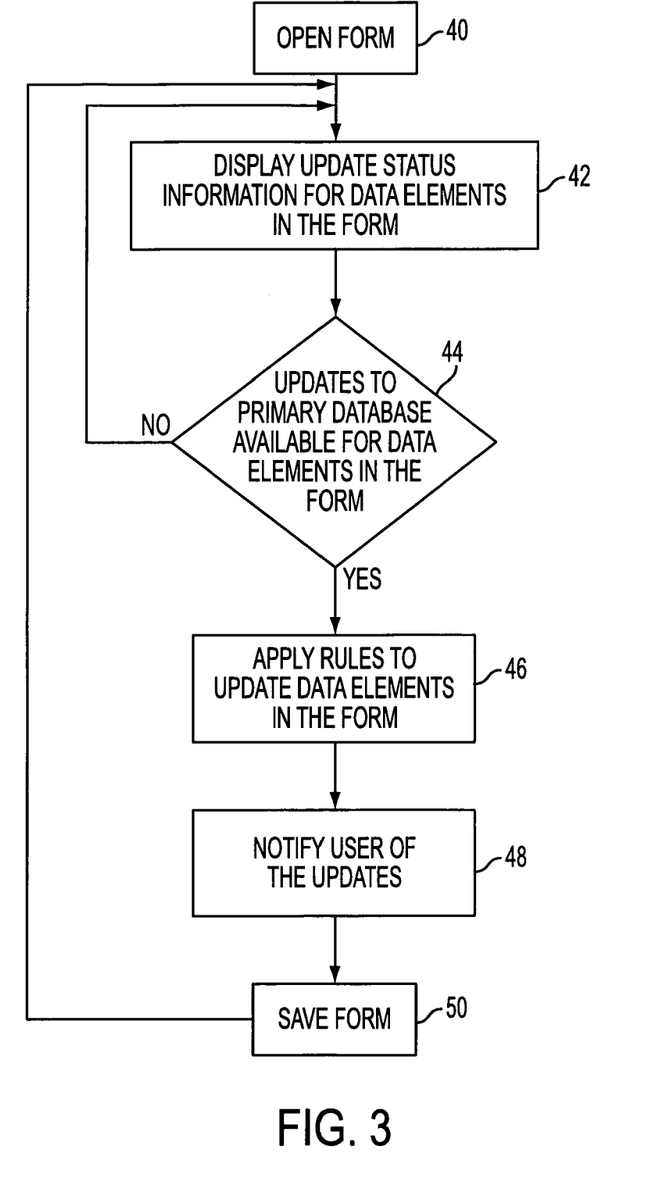
FIG. 3 is a flow chart of operations in the present invention.

Operation of the present invention will be described with reference to FIG. 3. The operation of the present invention is the same for the standalone or the network configuration. Therefore, operation of the network configuration (FIG. 1) will be described as an exemplary embodiment. While the present invention is directed to synchronization of simultaneous changes by users to a database, an embodiment of the present invention takes the form of a software process in a system in which applications 16 use form documents. For example, a health/clinical information system includes various applications that use and share forms to input, for example, patient data. The system of the present invention using conventional techniques maintains a history of the revisions by users of forms to the data in the database 13. For example, a transaction log database can maintain a log of changes made to the database 13. When an application 16a opens a form at 40, for example, based upon a user command, the application 16 accesses data corresponding to the form opened from the network database 13 and inputs the data in the form for processing (use) by the user. Each application 16 can use one or more forms and the forms can have overlapping data elements.

Because the history of the changes to the data in the network database 13 is maintained, an update status information or log of updates to the data elements in the opened form may be provided to the user at 42, providing the user an opportunity to review the updates. The software process 20a corresponding to the application 16a periodically (as determined according to system requirements) checks the network database 13 at 44 for any available updates to data elements of the opened form. Further, the software process 20a can maintain a history the revisions to the opened form, such that software process 20a can determine a time the form or the local application-database 18a was last synchronized with the network database 13. If changes to the data elements of the opened form are available, rules corresponding to the changes in the database 13 are applied at 46 to update the data elements of the opened form. While the form is open, a user is notified of any updates to the opened form at 48. Further, an update status information or log of the updates may be provided to the user at 48, providing the user with the opportunity to review the updates and to change the updates if necessary before saving the form at 50.

Therefore, the present invention provides an efficient last in, last win update procedure (i.e., synchronization) when simultaneous changes are being made to a database by substantially reducing or eliminating the undesirable effect of inadvertently (unintentionally) overwriting other users' data. Further, providing update status information at 42 and 48 accommodates differentiating data (fields) that have been changed by the user who opened the form, fields that have not changed since the form was opened and fields that have been updated from the network database 13 while the form has remained opened. The user can review all current and past changes to the data (changes by the user and other users) in the form for validation before saving the data to the network database 13, which in some circumstances may have legal ramifications, such as approval of the data by the user. Further, automatic update of the form opened by a first user using data input by a second user eliminates unnecessary data entry by the first user. For example, one user can open a mostly blank form and complete (fill in) majority of the fields. Before the first user saves the form, a second user can open the same form at a different location to find that the form is mostly empty. If the first user saves the completed form, which saves data input in the form to the network database 13, thereafter the second user's form would automatically by updated (filled) by the software process 20 of the present invention. The second user only has to complete remaining empty fields of the form, which saves time.

Figure 4:
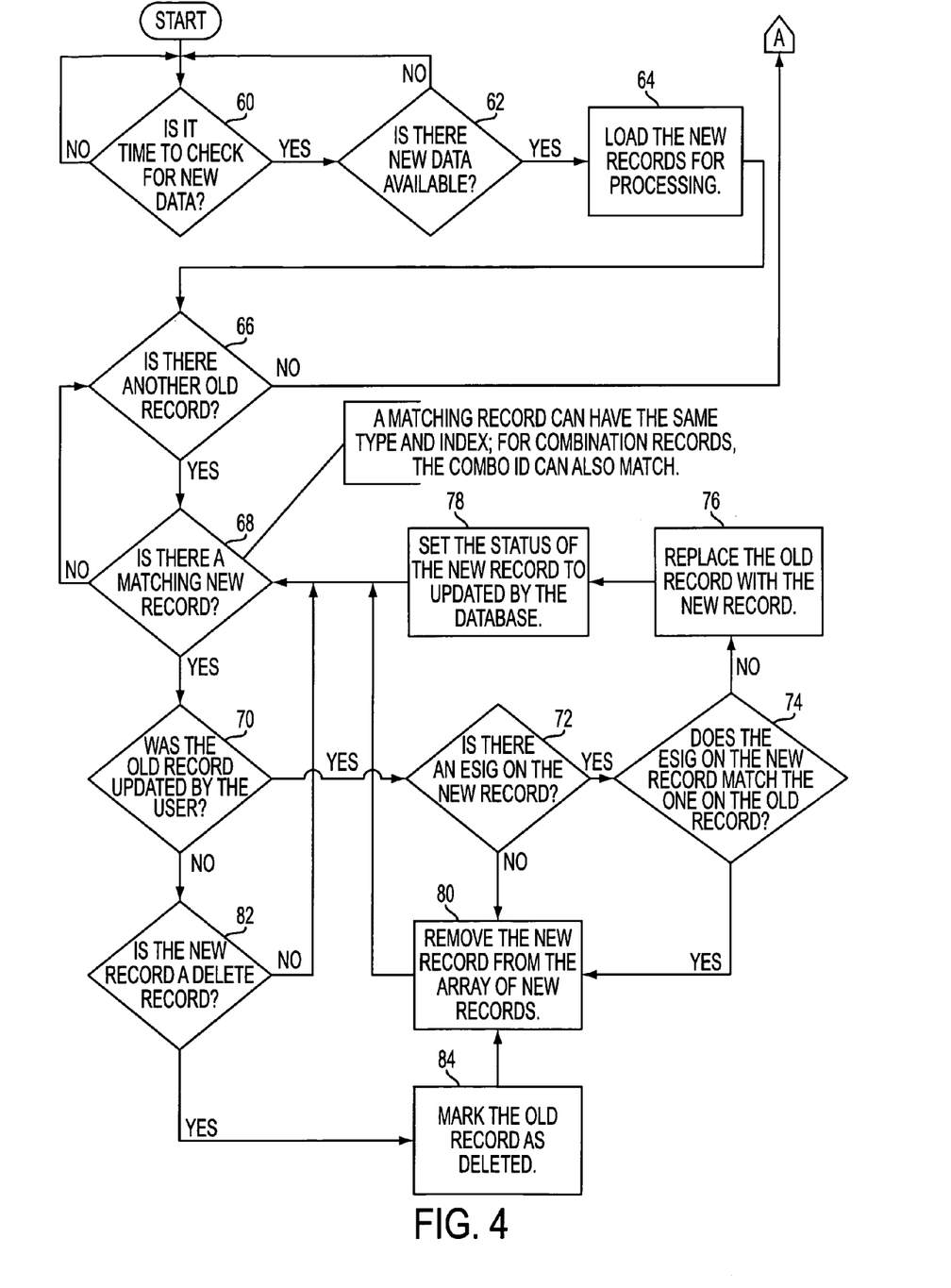
FIGS. 4–6 are flow charts of a software process according to the present invention.
Figure 5:
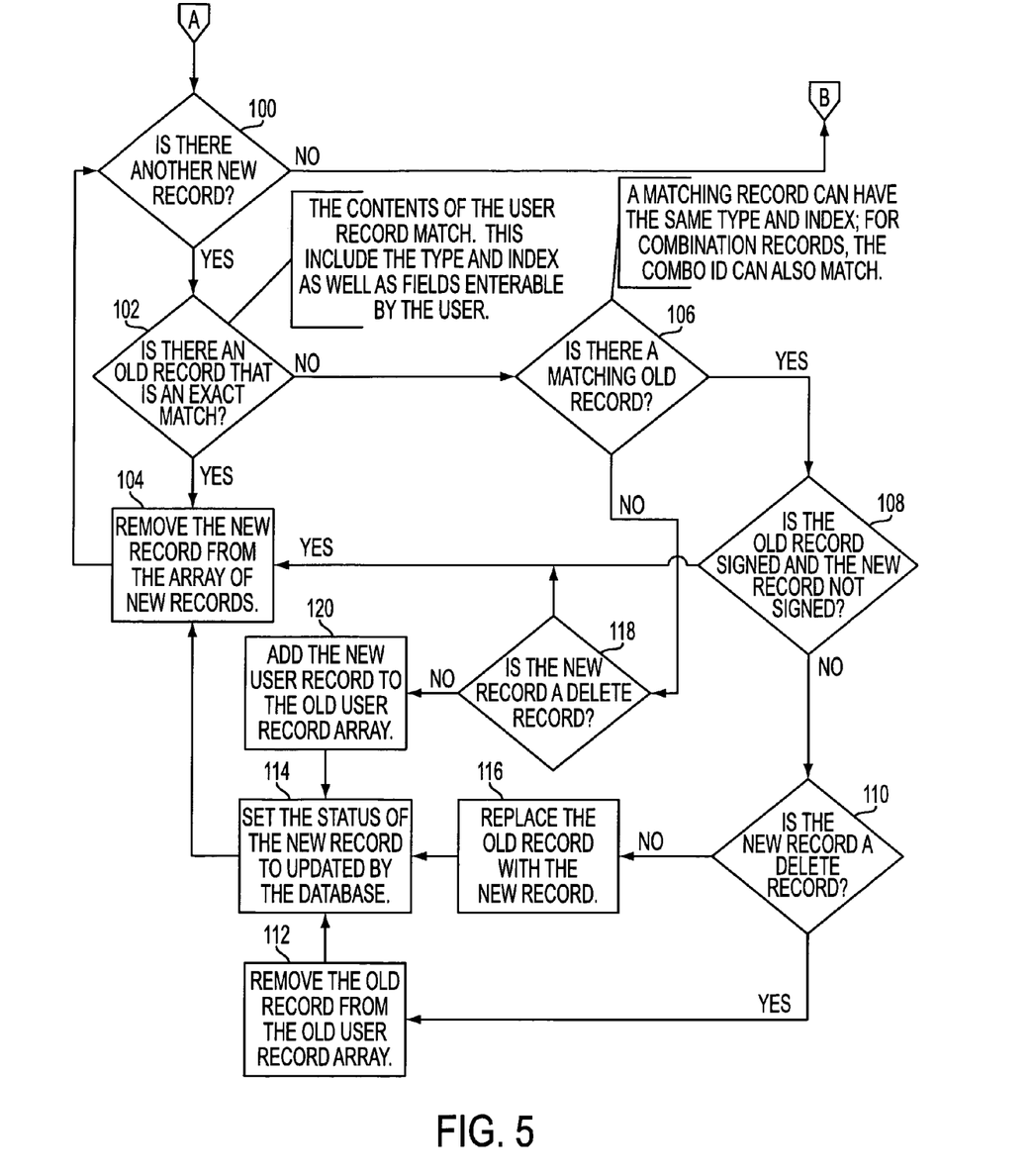
Figure 6:
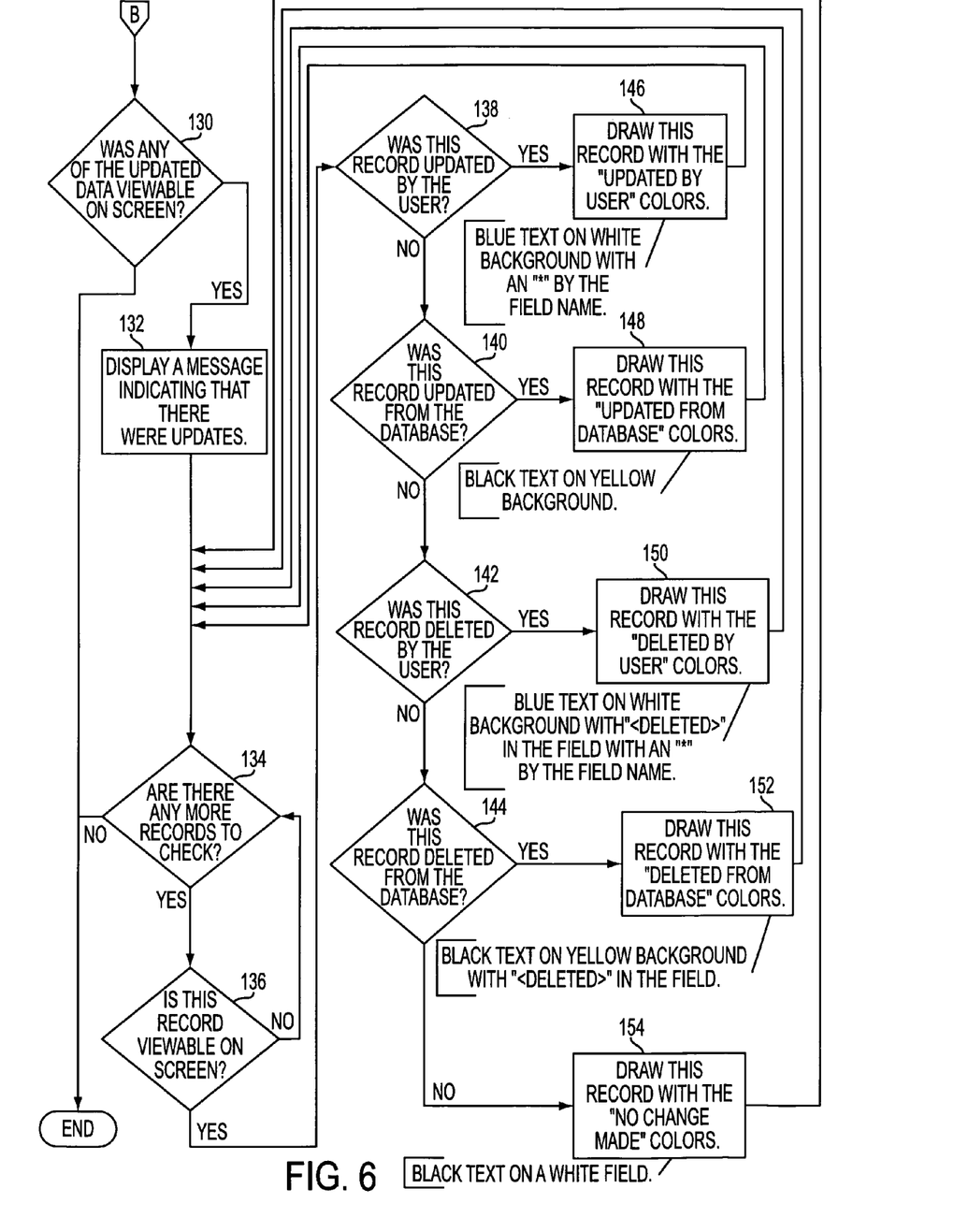

The operation of software process 20 will be described in more detail with reference to FIGS. 4–6. In particular, FIGS. 4–6 are flow charts of an exemplary synchronization rule set applied in response to changes to a primary database to update the data elements of a form while the form is open. A form can be a collection of data elements/data points. A data element, for example, may represent a "last name" and a "telephone number" field, including a last name and telephone number entry (data) in the field. In FIG. 4, software process 20, at 60 and 62, periodically checks the database (e.g., network database 13, local primary database 32) for available new data (updates) to accessed data in a form opened. In particular, for each data element in an opened form, at 62 the network database 13 is checked for an update. If updates are available, at 64 the new records (changed data elements and information related thereto) are retrieved from the network database 13 and loaded for processing as an array (list) of new records. The software process 20 checks records existing as of the last time the form was updated or as of the time the form was opened (old records) against new records (e.g., records from databases 13, 32). For example, old records are records being used or worked on and can, for example, contain data stored in the application-based database 18, or data stored in the client terminal 14 memory. Initially, at 66 old records with entries (data) or as edited (completed or filled data elements), for example by a user, in the opened form are checked against the new records. If there is an old record to be processed in the opened form at 66, the old record and the new record are compared at 68 for a data element match (i.e., is the old record the same data element as the new record, such as both are "last name"). A match, for example, can be determined if the records have the same type and index. Combination data elements in a form can contain one or more entries or selections, such as patient medications and allergies in a health information system. If the new record is a combination, a combination identification can also be used as a match criteria. If there is not a match at 68, the comparing is repeated for other old records in the opened form at 66. If there is a match at 68, the old record is checked at 70 to determine if the old record was updated by the user of the opened form. If the old record was updated by the user at 70, the new record is checked at 72 to determine if the new record was electronically signed (esig). A data element may be electronically signed using conventional techniques, such as by requiring a password to edit the data element. If the new record was electronically signed, the electronic signature of the old record and the new record are compared for a match at 74. If the electronic signature of the old and the new record do not match, the old record is replaced with the new electronically record at 76. Therefore, at 76 a data element of the opened form is updated with a changed data element from the database 13. A status flag at 78 can be set to indicate occurrence of an update. The status flag can be used to provide a user with update status information, which will be described in more detail below.

If at 74, the electronic signature of the new record matches the electronic signature of the old record, the new record is removed from the list of new records at 80. Further, if there is no electronic signature on the new record at 72, the new record is removed from the list of new records at 80. Therefore, as a rule, an existing field (old record) completed by a user of an opened form is replaced or updated with new data from the database 13 only if the new data is electronically signed by another user (i.e., another user has higher priority, disallowing edits to the signed data element by other users). As a general rule, the user's current changes to the opened form (but not yet saved to the database 13), which may or may not be electronically signed, will be retained over changes from the network database 13, unless the changes (e.g., by another user) from the network database 13 are electronically signed by the other users. For example, if a first user signs a data element and saves the data element in the network database 13, entry (data) in the signed data element cannot be modified or removed by a second user who has opened a form that includes the same signed data element and the second user has changed and signed the same data element but has not yet saved the data element to the database 13. Under this circumstance, the form opened by the second user will be updated with data from the signed data element by the first user.

If at 70, the old record has not been updated by the user, the new record is checked at 82 to determine if the new record is a delete record. If the new record is a delete record at 82, the old record is marked as deleted at 84 and the new record is removed at 80 from the list of available new records. The marking indicates occurrence of an update.

In summary, the example synchronization rule set in FIG. 4 provides: if there is a record in a form opened (old record), for example, by a user to use, and the old record was entered or modified by the user and there is a matching new record (e.g., from the network database 13) with no electronic signature, the new record will be removed from the array of new records without an update to the opened form (66 to 68 to 70 to 72 to 80). If there is an old record that was entered or modified by the user and there is a matching new record with a matching electronic signature (e.g., signed by the same user), the new record will be removed from the array of new records without an update to the opened form (66 to 68 to 70 to 74 to 80). If there is an old record that was entered or modified by the user and there is a matching new record with a non-matching electronic signature (e.g., signed by a different user), the old record will be replaced (update will occur) by the new record (66 to 68 to 72 to 74 to 76 to 78). If there is an old record that was not entered or modified by the user and there is a matching new record marked as deleted, the old record will be marked as deleted (update will occur) and the new record will be removed from the array of new record (66 to 68 to 82 to 84 to 80). Of course, other synchronization rule sets can be applied in the present invention and the present invention is not limited to the exemplary synchronization rule set in FIGS. 4–6.

With reference to FIG. 5, if the condition at 66 is not satisfied, remaining new records in the array of new records are processed starting at 100. In particular, at 100 any new records that were added to the array of old records (i.e., array of records in the opened form and being used or worked on) will be considered old records for processing at 100. Generally, at 100 remaining old records to be processed are empty/blank and combination records in which additional information may be input, such as the "medication" field containing one or more medication names. If there are old records at 100, the old records and the new records are compared at 102 for a data element and content match (i.e., is the old record the same data element as the new record, such as both are "last name," and does the entry in the old record, which may be blank or completed in a combo field, match the entry of the new record). A match, for example, can be determined if the records have the same type, index and data. If the new record is a combination, a combination identification can also be used as a match criteria. If there is a match at 102, the new record is removed at 104 from the array of new records and the comparing is repeated for other old records in the opened form at 100. Therefore, an update does not need to occur if entries (data) of a combination old record are the same as the entries of the new record. If there is not a match at 102, the old record is checked at 106 to confirm if the old record and the new record match by being the same data element. A match, for example, can be determined if the records have the same type and index. If the new record is a combination data element, a combination identification can also be used as a match criteria.

If there is a match at 106, the old record is checked at 108 to determine if the old record is electronically signed and the new record is not electronically signed. If at 108, the old record is signed and the new record is not signed, the update will not occur by removing at 104 the new record from the array of new records. Therefore, at 108, because the old record is signed, under a rule to be applied, another user cannot overwrite or edit a signed data element of the user working on the opened form (i.e., the user of the opened form can save the form so that the signed data element will overwrite the other user's data). This rule is also consistent with the general rule (as described above) that a completed field and not signed by a user in an opened form will be retained over available update data from the network database 13, unless the update data is signed having higher priority. Therefore, at 108, if the old record is signed and the new record is also signed, update of the opened form can occur and the new record is checked for the type of update at 110. Further, at 108, if the old record is not signed and the new record is signed, update of the opened form can occur and the new record is checked for the type of update at 110. Further, at 108, if the old record is not signed and the new record is also not signed, update of the opened form can occur and the new record is checked for the type of update at 110.

If at 110, the new record is a delete record, the old record in the form is removed (i.e., the data entry of the field in the form is removed) at 112 and a status flag at 114 can be set to indicate occurrence of an update. If at 110, the new record is not a delete record, the old record in the form is replaced at 116 with the new record (i.e., the data entry of the field in the form is updated). Thereafter, a status flag at 114 can be set to indicate occurrence of an update.

If at 106 the old record and the new record do not match, the new record is checked at 118 to determine if the new record is a delete record. If at 118, the new record is a delete record, the new record is removed at 104 from the array of new records to stop processing of the new record. If at 118, the new record is not a delete record, the new user record is added at 120 to the old user record array. Therefore, at 120, the data entry of a combination field in the form is updated, for example, by adding data entries, such as another medication to the "medication" field. Thereafter, a status flag at 114 can be set to indicate occurrence of an update. At 104, after the status flag is set at 114, after a data element of the form has been updated, or after processing of a new update record, the new record is removed from the array of new records and the process to check old records of the form at 100 is repeated.

In summary, the example synchronization rule set in FIG. 5 provides: if there is a new record that exactly (i.e., same data element and entry) matches an old record, the new record will be removed (100 to 102 to 104). If there is a new record that is electronically signed and there is a matching old record, the old record will be replaced (update will occur) with the new record (100 to 106 to 108 to 110 to 116 to 114 to 104). If there is a new record that is marked as deleted that matches an old record that is not electronically signed, the old record will be removed (update will occur) (100 to 106 to 108 to 110 to 112 to 114 to 104). If there is a new record that is not electronically signed that matches an old record that is not electronically signed, the old record will be replaced (update will occur) with the new record (100 to 106 to 108 to 110 to 116 to 114 to 104). If there is a new record that is not electronically signed that matches an old record that is electronically signed, the new record will be removed without an update to opened form (100 to 106 to 108 to 104). If there is a new record that does not match any old record, the new record will be added to the array of old records (i.e., update will occur by completing a data element in the opened form or adding an entry to a combination data element in the opened form) (100 to 106 to 118 to 120 to 114 to 104). If there is a new record that is marked as deleted and does not match any old record, the new record will be removed from the array of new records without updating the opened form (100 to 106 to 118 to 104).

Of course, other synchronization rule sets can be applied and the present invention is not limited to the exemplary synchronization rule set described with reference to FIG. 5. For example, a new record can be presented to the user for consideration/approval before automatically updating the user's form. Therefore a selective automatic data refresh can be provided. Further, the software process 20 of the present invention can extend to n-users and n-forms. For example, if four users are editing forms, and one of the users saves data, the other three users can get updates if their forms contain data elements the overlap with the user who saved the data.

With reference to FIG. 6, if at 100, there are not other old records to be processed, the system determines at 130 if the updated data elements were viewable on a display screen of the client terminal 14. If the updated data elements are not viewable at 130, processing of the new records from the database 13 is complete. If the updated data elements are viewable, a message can be displayed at 132 to indicate or notify the user working on the opened form of updates. For all viewable records (data elements), at 134–144, update history/log information can be displayed on a display screen of client terminal 14. In particular, the update log information can be displayed using different colors, icons, or commentary bubbles, to provide the user the opportunity to review the updates, types of updates and to accommodate efficient validation/confirmation or authorization of the updates. For example, if at 138 a form data element (field) has been updated by the user of the opened form, a specified "updated by user" color can be used at 146 to display entries (data) of the field. At 148, entries of a field can be displayed with a specified "updated from the network database" color. At 150, entries of a field can be displayed with a specified "deleted by user" color. At 152, entries of a field can be displayed with a specified "deleted from the network database" color. At 148, entries of a field can be displayed with a specified "no changes made" color. Of course, the icons and information bubbles can be any type of information or image associated with types of updates to a data element in a form opened and displayed on a computer.

Therefore, the present invention can, for example, advantageously provide a system allowing multiple users to work simultaneously using data from a database without locking the common database. Further, the present invention can, for example, provide a system allowing multiple users to work simultaneously using data from a database without inadvertently overwriting prior data input in the database by another user. Further, the present invention can, for example, provide a system informing users working simultaneously using data from a database of changes made by other users to the database while working on the data.

More particularly, the present invention can, for example, provide a system allowing users using applications, which may be different applications, that use form documents containing data from a database to access, edit and update the form data (data elements) without locking the database, to prevent inadvertently overwriting changes to the database by other users while a first user is editing (updating) the form data, and to inform the users of changes to the database by other users while the users are accessing the form data. Further, the present invention can, for example, provide an efficient data refresh during use of an application, by applying synchronization rules to update data elements in the application during execution. In particular, the present invention can, for example, provide a system allowing users to efficiently and simultaneously edit form documents, which are a collection of data elements/points from a database. Further, the system of the present invention accommodates different forms used by different applications, the forms having overlapping (sharing) data elements.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A process for automatically updating data elements in a form document being used by a first software application, the process comprising:

accessing data elements stored in a common database that correspond to the form document being used by the first software application, wherein the data elements of the database can be common to more than one different form documents of more than one different software applications having access to the common database, further wherein each data element includes at least (i) a field and (ii) data in the field;

inputting the accessed data elements into the form document, wherein the first software application is responsive to a first user input for making changes to the accessed data elements within the form document;

using the first software application for making changes to the inputted accessed data elements within the form document in response to input by the first user;

monitoring the common database to detect changes to the accessed data elements that may have been changed (i) by the first software application or (ii) by a second software application different from the first software application in response to input of a second user, while the form document is being used by the first software application in response to input by the first user; and updating the accessed data elements in the form document while the form document is being used by the first software application in response to input of the first user, wherein the updating occurs in accordance with rules corresponding to the detected changes, further wherein the monitoring of the common database and the updating of the data elements in the form document comprise (i) a program segment of the first software application or (ii) a software process implemented as a thread executing in a multi-tasking operating system environment, wherein the program segment or software process implemented as a thread (a) periodically checks the common database for available updates to the accessed data elements, (b) retrieves new records from the common database in response to an availability of updates, the new records corresponding to the accessed data elements that have changed, and (c) processes the new records corresponding to the changed data elements as an array of new records for updating the accessed data elements in the form document while the form document is being used by the first software application, further wherein processing the array of new records includes adding new records to the array of new records or deleting new records from the array of new records in response to one or more comparisons against old records of the form document, the old records corresponding to records existing as of a last time the accessed data elements of the form document were updated or as of a time the form document was opened, the adding or deleting to the array of new records further being in accordance with the rules corresponding to the detected changes, wherein the rules are based upon (I) a characteristic of the change to the accessed data elements by the second software application, wherein the characteristic of the change comprises the accessed data elements having been electronically signed by the second user in which the electronically signed data elements require a password to edit the corresponding data elements, and (II) a characteristic of the accessed data elements used by the first software application, wherein the characteristic of the accessed data elements comprises (i) a change to a field of the accessed data elements while the form document has remained open by the first software application, (ii) fields of the accessed data elements having been updated from the common database while the form document has remained open by the first software application, (iii) fields of the accessed data elements that have not changed since the form document was opened by the first software application, and (iv) the accessed data elements having been electronically signed by the first user in which the electronically signed data elements require a password to edit the corresponding data elements.

2. The process according to claim 1, further comprising:
displaying an update status of the accessed data elements in accordance with the updating;
validating present and past changes to the accessed data elements of the form document; and
storing the validated present and past changes to the accessed data elements in the common database.

3. A device for automatically updating data elements in a form document being used by a first software application comprising:

a processor; and computer readable media encoded with processing instructions for execution by the processor, the processing instructions including instructions:

to access data elements stored in a common database that correspond to the form document being used by the first software application, wherein the data elements of the database can be common to more than one different form documents of more than one different software applications having access to the common database, further wherein each data element includes at least (i) a field and (ii) data in the field, to input the accessed data into the form document, wherein the first software application is responsive to a first user input for making changes to the accessed data elements within the form document, to use the first software application for making changes to the inputted accessed data elements within the form document in response to input by the first user, to monitor the common database to detect changes to the accessed data elements that may have changed (i) by the first software application or (ii) by a second software application different from the first software application in response to input of a second user, while the form document is being used by the first software application in response to input by the first user, and to update the accessed data elements in the form document while the form document is being used by the first software application in response to input of the first user, wherein the updating occurs in accordance with rules corresponding to the detected changes, further wherein the computer readable media further comprises (i) a program segment of the first software application or (ii) a software process implemented as a thread executing in a multi-tasking operating system environment, wherein the program segment or software process implemented as a thread (a) periodically checks the common database for available updates to the accessed data elements, (b) retrieves new records from the common database in response to an availability of updates, the new records corresponding to the accessed data elements that have changed, and (c) processes the new records corresponding to the changed data elements as an array of new records for updating the accessed data elements in the form document while the form document is being used by the first software application, further wherein processing the array of new records includes adding new records to the array of new records or deleting new records from the array of new records in response to one or more comparisons against old records of the form document, the old records corresponding to records existing as of a last time the accessed data elements of the form document were updated or as of a time the form document was opened, the adding or deleting to the array of new records further being in accordance with the rules corresponding to the detected changes, wherein the rules are based upon (I) a characteristic of the change to the accessed data elements by the second software application, wherein the characteristic of the change comprises the accessed data elements having been electronically signed by the second user in which the electronically signed data elements require a password to edit the corresponding data elements, and (II) a characteristic of the accessed data elements used by the first software application, wherein the characteristic of the accessed data elements comprises (i) a change to a field of the accessed data elements while the form document has remained open by the first software application, (ii) fields of the accessed data elements having been updated from the common database while the form document has remained open by the first software application, (iii) fields of the accessed data elements that have not changed since the form document was opened by the first software application, and (iv) the accessed data elements having been electronically signed by the first user in which the electronically signed data elements require a password to edit the corresponding data elements.

4. The device according to claim 3, further wherein the rules synchronize simultaneous changes made to the accessed data elements.

5. The device according to claim 3, wherein the computer readable media is further encoded with processing instructions so that the processor provides update notification to the first user while the form document is being used by the first software application.

6. The device according to claim 5, wherein the update notification comprises displaying update history information corresponding to each accessed data element in the form document.

7. The device according to claim 6, wherein the update notification includes displaying the accessed data elements in different colors in accordance with the updating.

8. A computer readable medium encoded with processing instructions for implementing a method of automatically updating data elements in a form document and to be performed by a computer, the method comprising:

accessing data elements stored in a common database that correspond to the form document to be used by a first software application, wherein the data elements of the database can be common to more than one different form documents of more than one different software applications having access to the common database, further wherein each data element includes at least (i) a field and (ii) data in the field;

inputting the accessed data elements into the form document;

using the form document, wherein changes can be made to the inputted accessed data elements within the form document by a first software application in response to input by a first user;

monitoring the common database to detect changes to the accessed data elements that may have changed by (i) the first software application or (ii) by a second software application in response to input of a second user, while the form document is being used by the first software application; and updating the accessed data elements in the form document while the form document is being used by the first user, wherein the updating occurs in accordance with rules corresponding to the detected changes, further wherein monitoring of the common database and the updating of the data elements in the form document comprises (a) periodically checking the common database for available updates to the accessed data elements, (b) retrieving new records from the common database in response to an availability of updates, the new records corresponding to the accessed data elements that have changed, and (c) processing the new records corresponding to the changed data elements as an array of new records for updating the accessed data elements in the form document while the form document is being used by the first software application, further wherein processing the array of new records includes adding new records to the array of new records or deleting new records from the array of new records in response to one or more comparisons against old records of the form document, the old records corresponding to records existing as of a last time the accessed data elements of the form document were updated or as of a time the form document was opened, the adding or deleting to the array of new records further being in accordance with the rules corresponding to the detected changes, wherein the rules are based upon (I) a characteristic of the change to the accessed data elements by the second software application, wherein the characteristic of the change comprises the accessed data elements having been electronically signed by the second user in which the electronically signed data elements require a password to edit the corresponding data elements, and (II) a characteristic of the accessed data elements used by the first software application, wherein the characteristic of the accessed data elements comprises (i) a change to a field of the accessed data elements while the form document has remained open by the first software application, (ii) fields of the accessed data elements having been updated from the common database while the form document has remained open by the first software application, (iii) fields of the accessed data elements that have not changed since the form document was opened by the first software application, and (iv) the accessed data elements having been electronically signed by the first user in which the electronically signed data elements require a password to edit the corresponding data elements.

* * * * *